(12) United States Patent
Geary

(10) Patent No.: US 6,914,530 B2
(45) Date of Patent: Jul. 5, 2005

(54) LIQUID INGRESS DETECTION

(76) Inventor: Ronald Frederick Geary, 174 Audlem Road, Nantwich, Cheshire (GB), CW5 7QJ ( * ) Notice: Subject to any disclaimer, the term of this patent is extended or adjusted under 35 U.S.C. 154(b) by 0 days.

(21) Appl. No.: 10/363,026
(22) PCT Filed: Aug. 29, 2001
(86) PCT No.: PCT/GB01/03845
§ 371 (c)(1), (2), (4) Date: Aug. 29, 2003
(87) PCT Pub. No.: WO02/18898
PCT Pub. Date: Mar. 7, 2002

(65) Prior Publication Data
US 2004/0026595 A1 Feb. 12, 2004

(30) Foreign Application Priority Data
Aug. 30, 2000 (GB) .............................................. 0021172
Apr. 11, 2001 (GB) .............................................. 0109207

(51) Int. Cl.$^7$ .............................................. G08B 21/00
(52) U.S. Cl. ...................... 340/604; 340/605; 340/618; 367/131; 367/199; 73/304 R
(58) Field of Search ................................ 340/602–606, 340/618, 854.3, 855.6, 856.4; 248/542, 543; 73/304 R, 170.29; 367/131, 197–199; 137/15.11

(56) References Cited

U.S. PATENT DOCUMENTS 4,965,554 A * 10/1990 Darling ...................... 340/604
5,463,377 A * 10/1995 Kronberg .................... 340/605
6,404,343 B1 * 6/2002 Andou et al. ............... 340/605

FOREIGN PATENT DOCUMENTS

WO 8403768 * 9/1984

* cited by examiner

Primary Examiner—Jeffery Hofsass
Assistant Examiner—Eric Blount
(74) Attorney, Agent, or Firm—Woodard, Emhardt, Moriarty, McNett & Henry LLP

(57) ABSTRACT

A method for detecting the ingress of liquid into an empty elongate hollow structure such as a support for an offshore platform which is at least in part submerged in a liquid. Sound is introduced into the structure by a sound generating device mounted within the hollow structure, the device comprising sound generating means and liquid detection means. When the liquid detection means detect an ingress of liquid into the structure, the sound generating means generate a sound in response to this detection. The generated sound propagates through the structure and sound is detected, and detection of the sound giving an indication of liquid ingress into the structure.

9 Claims, 1 Drawing Sheet

LIQUID INGRESS DETECTION

CROSS REFERENCE TO RELATED APPLICATIONS

The present application is a national stage filing based on International Application No. PCT/GB01/03845 (WO 02/18898), filed Aug. 29, 2001, which in turn claims priority to British Application Serial No. 0021172.2 filed Aug. 30, 2000 and British Application Serial No. 0109207.1 filed Apr. 11, 2001.

BACKGROUND OF THE INVENTION

The present invention relates to a method and apparatus for detecting the ingress of liquid into an elongate hollow structure, at least part of which is submerged in a liquid, and more particularly to such apparatus suitable for incorporation in offshore installations.

Many industrial applications require means of detecting the ingress of liquid into a structure and such means can be effectively used to detect leaks. An example of such an application can be found in the oil and gas industry. Here, offshore platforms are supported by water or oil-filled hollow members extending from the sea bed and braced by air filled hollow cross members. As the cross members are air filled, the presence of water within a cross member provides an indication that damage has occurred. It is most important that such damage to the cross members is detected as soon as possible to reduce the risks of injury to people or property.

One solution to the monitoring problem is to use a flooded member detection (FMD) method. This monitoring can either be performed using divers or remotely operated vehicles (ROVs). In each case detection techniques may involve the use an ultrasonic technique or a gamma radiation technique. In each of these methods, a detector identifies the presence of water directly behind an area of metal under examination. If this monitoring detects water more detailed examination of the member can be carried out to determine the necessary remedial action.

This method has a number of disadvantages. One such disadvantage is that in parts of the structure inaccessible to the diver or the ROV monitoring is not possible. Another is that by its nature the process can only take place at inspection intervals, typically every two years. If deterioration of a member occurs shortly after inspection it may be some considerable time before the same member is re-examined to enable the detection of damage, leading to a compromise in safety. The method is also limited to only finding water directly behind the point currently under examination, which means that inspection must be carried out at or adjacent the lowest point of the structure. This method is expensive to carry out with costs for the hire of an appropriate ROV or diving team being in the region £100,000 per day.

The present invention seeks to obviate or mitigate some or all of the problems identified above. In particular, it is an object of the present invention to provide a method of detecting damage to a structure which does not require direct access to the structure under investigation and which detects damage as soon as it occurs.

BRIEF SUMMARY OF THE INVENTION

According to the present invention, there is provided a method for detecting the ingress of liquid into an elongate hollow structure which is intended to be empty and at least part of which is submerged in a liquid, wherein a sound generating device comprising sound generating means and liquid detection means is mounted within the hollow structure, the sound generating means being arranged to generate sound within the structure in response detection of liquid by the detection means, sound propagated through the structure from the sound generating means is detected, and detection of the propagated sound is taken as an indication of liquid ingress into the structure.

In this document, sound is used to mean an alteration of properties of an elastic medium, such as pressure, particle displacement or density, that propagates through the medium.

Preferably, the liquid detection means comprise an electrolytic cell including exposed electrodes, any liquid present between the electrodes acting as an electrolyte such the device is powered only if liquid is present between the electrodes. Alternatively, the device may be powered by a power source which is capable of operation after long periods of quiescence. Suitably, the structure may be a support member of an offshore platform.

Suitably a number of elongate hollow structures may each be provided with a sound generation device, each device generating a unique signal, whereby the structure into which liquid ingress has occurred can be identified in dependence upon the detected signal.

The sound generating means may comprise a member which strikes the structure to generate sound, or alternatively or in addition the sound generating means may comprise a speaker.

A device for detecting generated sound may be located above the surface of the liquid in which the structure is at least partially submerged, or alternatively a device for detecting generate sound may be located below the surface of the liquid in which the structure is at least partially submerged.

According to a second aspect of the present invention there is provided an apparatus for carrying out a method as described above comprising at least one sound generation device and a sound detection device.

Specific embodiments of the present invention will now be described, by way of example, with reference to the accompanying drawings, in which:

BRIEF DESCRIPTION OF THE DRAWINGS

In all figures, like numerals are used to refer to like parts.

DETAILED DESCRIPTION OF THE INVENTION

Figure 1:
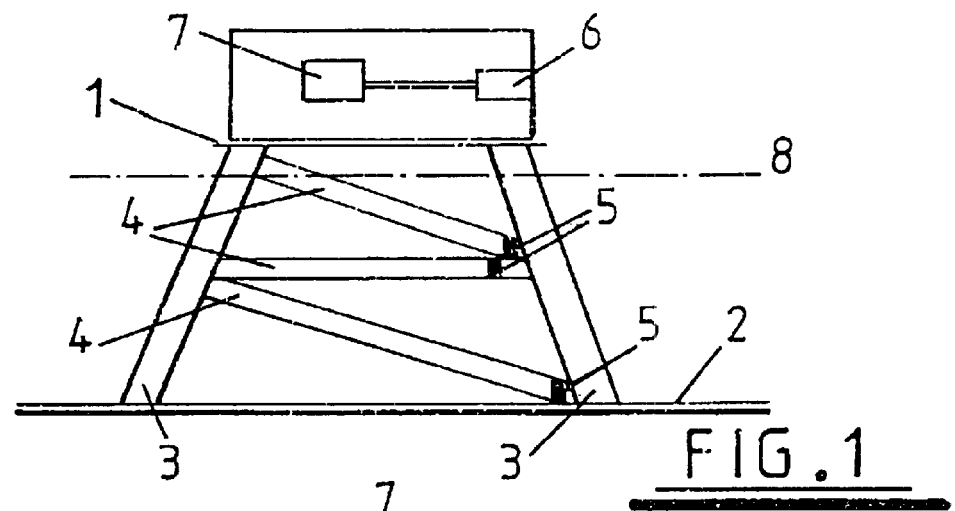
FIGS. 1 to 3 illustrate respective examples of applications of the invention to offshore structures.
Figure 2:
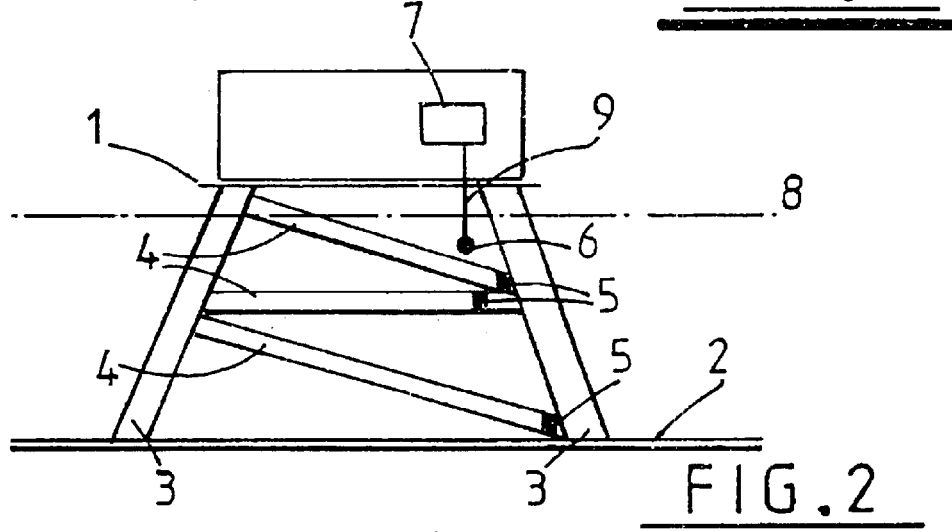
Figure 3:
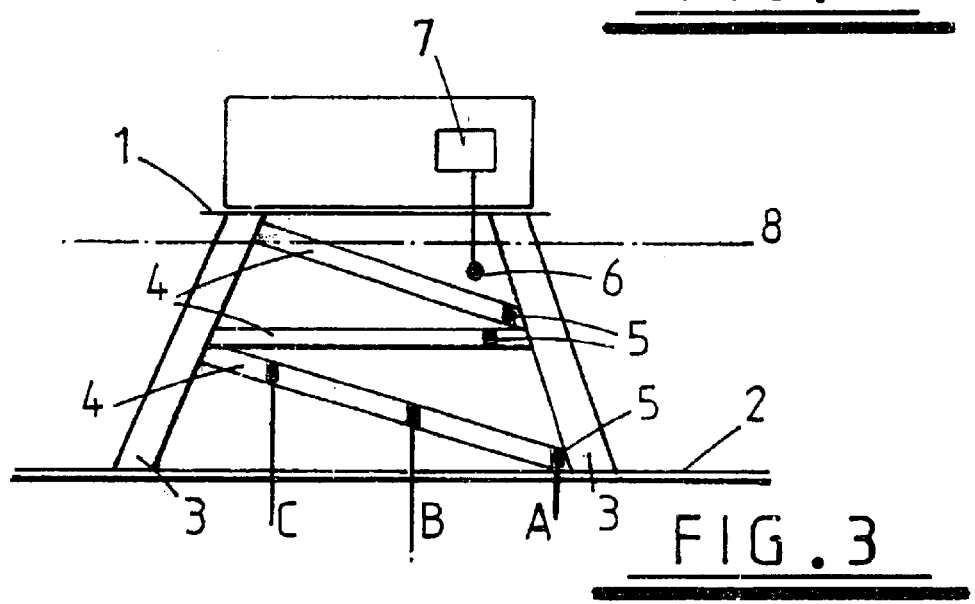

Referring to FIGS. 1 to 3, example applications of the invention are shown. An offshore platform, 1, is supported on the sea bed 2 by three or more main support legs 3 braced by hollow cross members 4. The main support legs 3 are filled with water or fuel oil to act as ballast for the platform. The cross members 4 are hollow and air filled, and if no cracks are present in the structure, will be bone dry. Devices 5 are provided inside each cross member 4 for introducing sound into the cross members 4 (hereinafter a sound generation device). The figures show a sound detection device 6 connected to a logging device 7. The level of water is schematically illustrated by line 8.

Operation of the invention will now be described with reference to FIG. 1. The sound generating devices 5 are mounted within the cross members 4 at the time of manufacture. Each sound generating device 5 is provided with means to detect the presence of water, and is therefore fitted at the lowest point in the cross member such that it will detect water entering at any point along the member 4 and flowing in a downwards direction. When water is detected, the sound generation device 5 generates sound which propagates through the structure to the sound detection device 6. An output of the device 6 is passed to the logging device 7. Therefore any water ingress into the structure will activate the sound generating device 5 and this activation will then be detected by sound detection device 6 and logged.

The sound generating device 5 is powered by a power supply incorporating an electrolytic cell including exposed positive and negative electrodes of a cell on device 5. When water enters the structure it will submerge the electrodes and act as an electrolyte of the cell. Thus the sound generating device 5 is automatically activated only in the presence of water.

An alternative embodiment of the invention is shown in FIG. 2. Here the sound generating devices 5 are again fitted within respective cross members 4 of the structure. However here the sound detection device 6 is attached to the platform 1 by a line 9 so as to be submerged. The device 6 is again connected to the logging device 7. In this configuration, it is possible to position the sound detection device 6 easily. Sound propagating through the structure is also propagated through the water around the structure to reach the detection device 6.

In the embodiments of FIGS. 1 and 2, each member 4 of the structure is provided with a sound generating device, thus allowing ingress of water into any member 4 of the structure to be detected. The sound generating device of each member 4 may be programmed to produce a respective characteristic sound, e.g. a respective tone. Thus the logging device 7 can store a library of tones together with the identities of the members with which they are associated. Therefore when the detected sound is passed from the sound detection device 6 to the logging device 7, an indication of the identity of the damaged member 4 will be provided by comparing the detected sound with the library of sounds stored.

Referring to FIG. 3, in this embodiment of the invention three sound generating devices 5 labelled A, B and C are fitted within the lowermost member 4 of the structure. At the first ingress of water into the structure, the water will pass to the lowermost point of the member, and device A will be activated. As more water enters the member, device B and then C will be activated. Each device will generate a different sound in response to the detection of water. Therefore using a method analogous to that described above to correlate the detected sound with a particular detection device, the logging device 7 can detect which device has been activated and thereby determine the rate of ingress of water into the structure.

Suitable sound generation means may include, for example, means for striking the structure, or a speaker for the electric generation of the necessary sound. A suitable electric means for generation of the sound would be a piezo-electic transducer which produces a high frequency signal which may be detected by the sound detection device 6.

It will be appreciated by those skilled in the art that a combination of the methods shown in the embodiments could be employed to carry out the method of the invention.

It will be understood that offshore installations may be subject to a considerable amount of background noise. This may be overcome by causing the sound generating device to generate a predetermined sound pattern, for example a number of spaced sounds, and allowing detection only when the predetermined pattern is detected. The use of a temporally spaced plurality of samples will thus minimise the effects of any background noise, thus providing a filtering mechanism.

The automatic activation of the sound generating devices by the presence of water will result in an instant detection of damage to the structure, thus enhancing the safety of the platform. Additionally, the costs associated with known FMD methods will be substantially mitigated.

What is claimed is:

1. A method for detecting the ingress of liquid into an elongate hollow structure which is intended to be empty and at least part of which is submerged in a liquid, wherein a sound generating device comprising sound generating means and liquid detection means is mounted within the hollow structure, the sound generating means being arranged to generate sound within the structure in response to detection of liquid by the detection means, sound propagated through the structure from the sound generating means is detected, and detection of the propagated sound is taken as an indication of liquid ingress into the structure.

2. A method according to claim 1, wherein the liquid detection means comprise an electrolytic cell including exposed electrodes, any liquid present between the two electrodes acting as an electrolyte such that the device is powered only if liquid is present between the electrodes.

3. A method according to claim 1, wherein the structure is a support member of an offshore platform.

4. A method according to claim 1, wherein a number of elongate hollow structures are each provided with a sound generation device, each device generating a unique signal, whereby the structure into which liquid ingress has occurred can be identified in dependence upon the detected signal.

5. A method according to claim 1, wherein the sound generating means comprise a member which strikes the structure to generate sound.

6. A method according to claim 1, wherein the sound generating means comprise a speaker.

7. A method according to claim 1 wherein the generated sound is detected at a point located above the surface of the liquid in which the structure is at least partially submerged.

8. A method according to claim 1, wherein the generated sound is detected at a point located below the surface of the liquid in which the structure is at least partially submerged.

9. An apparatus for carrying out a method according to claim 1, comprising at least one sound generation device and a sound detection device.

* * * * *